United States Patent
Babinec et al.

(10) Patent No.: US 8,697,290 B2
(45) Date of Patent: Apr. 15, 2014

(54) LAMINATED BATTERY CELL COMPRISING MULTILAYER COMPOSITE SEPARATOR AND METHODS FOR CREATING THE SAME

(75) Inventors: Susan J. Babinec, Midland, MI (US); Gregory B. Less, Ypsilanti, MI (US); Dave Vieau, Boston, MA (US)

(73) Assignee: A123 Systems LLC, Livonia, MI (US)

( * ) Notice: Subject to any disclaimer, the term of this patent is extended or adjusted under 35 U.S.C. 154(b) by 251 days.

(21) Appl. No.: 12/685,838

(22) Filed: Jan. 12, 2010

(65) Prior Publication Data
US 2010/0261065 A1    Oct. 14, 2010

Related U.S. Application Data

(60) Provisional application No. 61/144,008, filed on Jan. 12, 2009, provisional application No. 61/262,311, filed on Nov. 18, 2009.

(51) Int. Cl.
*H01M 2/16* (2006.01)
*H01M 6/46* (2006.01)

(52) U.S. Cl.
USPC ........... 429/252; 429/246; 429/247; 429/249; 429/251; 429/162

(58) Field of Classification Search
USPC ......... 429/246, 228, 204, 247, 144, 251, 249, 429/252; 522/114; 29/623.1
See application file for complete search history.

(56) References Cited

U.S. PATENT DOCUMENTS

| | | | |
|---|---|---|---|
| 3,861,963 A | 1/1975 | Afrance et al. | |
| 4,224,393 A | 9/1980 | Feinberg et al. | |
| 5,194,341 A | 3/1993 | Bagley et al. | |
| 5,418,091 A | 5/1995 | Gozdz et al. | |
| 5,641,565 A | 6/1997 | Sogo et al. | |
| 5,643,695 A | 7/1997 | Barker et al. | |

(Continued)

FOREIGN PATENT DOCUMENTS

| | | |
|---|---|---|
| EP | 1667254 A1 | 6/2006 |
| EP | 1753056 A1 | 2/2007 |

(Continued)

OTHER PUBLICATIONS

International Search Report and Written Opinion for International Application No. PCT/US10/20769 mailed Mar. 2, 2010. (8 pages).

(Continued)

*Primary Examiner* — Kenneth Douyette
(74) *Attorney, Agent, or Firm* — Wilmer Cutler Pickering Hale and Dorr LLP

(57) ABSTRACT

Electrodes with a multilayer or monolayer composite separator are described. The multilayer composite separator comprises multiple individual composite separator layers. Each individual composite separator layer comprises inorganic particulate material(s) and organic polymer(s) with different inorganic particulate material/polymer weight ratios. The multilayer composite separator layer is constructed in a way such that the composite separator layer adjacent to the electrode active material contains a higher weight percentage of the inorganic particulate material and lower weight percentage of the organic polymer than the composite separator layer outermost from the electrode current collector. Laminated cells comprising a positive electrode, a negative electrode, a laminated multilayer or monolayer composite separator layer are described, wherein at least one of the electrodes has a multilayer or monolayer composite separator disposed onto the surface of the electrode. Methods of making such laminated cells are also described.

19 Claims, 7 Drawing Sheets

(56) References Cited

U.S. PATENT DOCUMENTS

| | | | |
|---|---|---|---|
| 5,691,047 A * | 11/1997 | Kurauchi et al. | 428/315.7 |
| 5,720,780 A | 2/1998 | Liu et al. | |
| 5,871,867 A | 2/1999 | Rausch et al. | |
| 5,882,721 A | 3/1999 | Delnick | |
| 5,894,656 A | 4/1999 | Menon et al. | |
| 5,935,543 A | 8/1999 | Boyer et al. | |
| 5,948,464 A | 9/1999 | Delnick | |
| 5,981,107 A * | 11/1999 | Hamano et al. | 429/231.95 |
| 6,077,468 A | 6/2000 | Jariwala et al. | |
| 6,148,503 A | 11/2000 | Delnick et al. | |
| 6,153,337 A | 11/2000 | Carlson et al. | |
| 6,180,281 B1 | 1/2001 | Schneider et al. | |
| 6,235,065 B1 | 5/2001 | Pasquier | |
| 6,277,514 B1 | 8/2001 | Ying et al. | |
| 6,511,517 B1 | 1/2003 | Ullrich et al. | |
| 6,511,774 B1 | 1/2003 | Tsukuda et al. | |
| 6,562,511 B2 | 5/2003 | Daroux et al. | |
| 6,821,672 B2 | 11/2004 | Zguris | |
| 6,913,855 B2 | 7/2005 | Stoker et al. | |
| 7,097,818 B2 | 8/2006 | Lindner et al. | |
| 7,214,448 B2 | 5/2007 | Barker et al. | |
| 7,704,641 B2 | 4/2010 | Yong et al. | |
| 2001/0000485 A1 | 4/2001 | Ying et al. | |
| 2002/0102455 A1* | 8/2002 | Daroux et al. | 429/144 |
| 2002/0165291 A1* | 11/2002 | Choi | 522/114 |
| 2004/0018428 A1 | 1/2004 | Cochran et al. | |
| 2004/0053122 A1 | 3/2004 | Sugiyama et al. | |
| 2004/0053123 A1 | 3/2004 | Chang et al. | |
| 2004/0166407 A1 | 8/2004 | Nakajima et al. | |
| 2004/0214084 A1 | 10/2004 | Barker et al. | |
| 2004/0262571 A1 | 12/2004 | Barker et al. | |
| 2005/0031942 A1 | 2/2005 | Hennige et al. | |
| 2005/0084761 A1 | 4/2005 | Hennige et al. | |
| 2005/0095505 A1 | 5/2005 | Ohata et al. | |
| 2005/0208383 A1 | 9/2005 | Totsuka et al. | |
| 2005/0255769 A1 | 11/2005 | Henninge et al. | |
| 2006/0008700 A1 | 1/2006 | Yong et al. | |
| 2006/0024569 A1 | 2/2006 | Hennige et al. | |
| 2006/0046138 A1 | 3/2006 | Hennige et al. | |
| 2006/0046149 A1 | 3/2006 | Yong et al. | |
| 2006/0078791 A1 | 4/2006 | Hennige et al. | |
| 2006/0093541 A1 | 5/2006 | Uhrlandt et al. | |
| 2006/0105245 A1 | 5/2006 | Ikuta et al. | |
| 2006/0166085 A1 | 7/2006 | Hennige et al. | |
| 2006/0254463 A1 | 11/2006 | Luginsland et al. | |
| 2006/0292450 A1 | 12/2006 | Nakanishi et al. | |
| 2007/0099072 A1 | 5/2007 | Hennige et al. | |
| 2007/0122716 A1 | 5/2007 | Seo et al. | |
| 2009/0087728 A1 | 4/2009 | Less et al. | |
| 2009/0155678 A1 | 6/2009 | Less et al. | |

FOREIGN PATENT DOCUMENTS

| | | |
|---|---|---|
| JP | 2001319634 | 11/2001 |
| KR | 1020070080245 | 8/2007 |
| WO | WO-94/20995 A2 | 9/1994 |
| WO | WO-02082565 A2 | 10/2002 |
| WO | WO-2006/045339 A2 | 5/2006 |
| WO | WO-2009026467 A1 | 2/2009 |

OTHER PUBLICATIONS

"Micropore in Catalysis." IUPAC Compendium of Chemical Terminology. Jun. 12, 2009 IUPAC, Research Triangle Park, NC XP55011608. 1 page.

European Search Report for European Patent Application No. 08833067.5 mailed Sep. 15, 2011. 9 pages.

Gamsjäger, Heinz et al. "Glossary of Terms Related to Solubility." *Pure Appl. Chem.* vol. 80, No. 2. pp. 233-276. Jan. 2008.

International Search Report and Written Opinion, International Application No. PCT/US08/73924, mailed Jan. 19, 2009 (7 pages).

International Search Report and Written Opinion, International Patent Application No. PCT/US08/078133, mailed Feb. 17, 2009 (8 pages).

Supplementary European Search Report for European Patent Application No. EP08827786.8 mailed Nov. 17, 2011. 14 pages.

Tarascon J-M et al. "Performance of Bellcore's Plastic Rechargeable Li-ion Batteries." Solid State Ionics. North Holland Pub. Company, Amsterdam, The Netherlands. vol. 86-88, Jan. 1, 1996, 49-54. 6 pages.

Venugopal, Ganesh et al. "Characterization of microporous separators for lithium-ion batteries" Journal of Power Sources, 77(1999) 34-41.

* cited by examiner

LAMINATED BATTERY CELL COMPRISING MULTILAYER COMPOSITE SEPARATOR AND METHODS FOR CREATING THE SAME

INCORPORATION BY REFERENCE

All patents, patent applications and publications cited herein are hereby incorporated by reference in their entirety in order to more fully describe the state of the art as known to those skilled therein as of the date of the invention described herein.

CROSS-REFERENCE

This application is related to a non-provisional application of U.S. application Ser. No. 12/196,203, filed Aug. 21, 2008, which is incorporated in its entirety by reference.

This application claims the benefit of priority under 35 U.S.C. §119(e) to U.S. Patent Application No. 61/144,008 filed on Jan. 12, 2009, entitled "LAMINATED BATTERY CELL AND METHODS FOR CREATING THE SAME," and U.S. Patent Application No. 61/262,311 filed on Nov. 18, 2009, entitled "COMPOSITE SEPARATOR FOR ELECTROCHEMICAL CELL FOR METHOD FOR ITS MANUFACTURE," which are incorporated herein by reference in its entirety.

FIELD OF THE INVENTION

This invention relates generally to electrochemical cells. More specifically, the invention relates to battery cells. Most specifically, the invention relates to separator layers for electrochemical battery cells.

BACKGROUND OF THE INVENTION

Lamination is an important process in battery cell assembly and could improve the battery performance characteristics and the ease of handling during manufacturing. In a battery cell, gases that are generated by a variety of mechanisms could have negative effects on the cell performance and characteristics. Current prismatic cell technology (without lamination) uses mechanically applied pressure to keep interfaces intact and to force gas to the edges, a process which adds undesired weight and volume to cells. In contrast, by laminating electrodes of a cell together one can potentially minimize the negative effects of gases by forcing them to the edges of the stack instead of allowing them to form interlayer bubbles and thereby increase interfacial resistance (especially important for prismatic cells). In addition, a properly laminated interface will often have lower impedance (resistance) than one which is not laminated, and would thereby improve the power characteristics of said cell. Secondly, great care needs to be taken to maintain the alignment of electrodes in a prismatic cell during the assembly process. By laminating the entire stack together into a monolithic entity during and/or immediately after stacking, the cell is less susceptible to misalignment in subsequent assembly steps.

Separator layers are important components of batteries. These layers serve to prevent contact of the anode and cathode of the battery while permitting electrolyte to pass there through. Additionally, battery performance attributes such as cycle life and power can be significantly affected by the choice of separator. For example, U.S. Pat. No. 5,587,253, assigned to Bell Communications Research Inc., discloses a soft polyvinylidene fluoride (PVdF)-HFP copolymer that has been highly plasticized for use as a binder in a composite separator. While the use of a softer composite separator may provide for gentler lamination conditions, the mechanical properties of the layer are degraded, resulting in other compromises and trade-offs to the cell.

Inorganic composite materials have also been used in separator layers. Such composite separators include a silica, alumina, $TiO_2$ (or other ceramic) filler materials and a polymer binder. The filler and binder may be blended and extruded to form a composite sheet and any volatile components are removed by extraction or evaporation to form a porous body. Other examples blend the filler and binder to form a mixture that is applied to a substrate by various coating means, such as doctor balding, roll coating or screen, stencil printing or gravure. The compositions of the polymer-inorganic separators affect the properties of resulting separator layers and the characteristics of the cell. Polymer-rich separator layers, while easier to laminate and providing better lamination strength, frequently result in less porosity, increased resistance, and lower conductivity. In contrast, inorganic filler-rich separator layers frequently have higher porosity and better conductivity, but are generally more difficult to laminate and result in lower lamination strength, under conditions which minimize damage to the cell.

Thus, there is a need for inorganic material-polymer separator materials that are easy to laminate and have good lamination strength, porosity and conductivity.

SUMMARY

An electrode includes current collector, electrode active material, and a multilayer composite separator layer disposed on the electrode active material is described. An electrode includes current collector, electrode active material, and a monolayer composite separator layer disposed on the electrode active material is also described.

A laminated electrochemical cell including a positive electrode, a negative electrode, and a laminate multilayer composite separator layer is described. The at least one of the electrodes has the multilayer or monolayer composite separator layer disposed on its electrode active material.

In one aspect, an electrode/separator assembly includes an electrode comprising an electrode current collector and an electroactive material layer disposed on one or both sides of the electrode current collector; and a porous multilayer composite separator layer disposed on one or both sides of the electrode, wherein said multilayer composite separator layer comprises at least first and second layers, said first and second layers comprising inorganic particulate material(s) and organic polymer(s) having different inorganic particulate material/organic polymer weight ratios; and wherein the first layer of the multilayer composite separator layer having a first weight percent of polymer is disposed over the electrode; and the second layer containing a higher weight percentage of organic polymer than the first layer is disposed as the outermost layer of the multilayer composite separator.

In one or more embodiments, the thickness of said first layer is 50% to 90% of the total thickness of the multilayer composite separator, or the thickness of said first layer is 90% of the total thickness of the bilayer composite separator layer, or the thickness of said first layer is 80% of the total thickness of the bilayer composite separator layer, or the thickness of said first layer is 70% of the total thickness of the bilayer composite separator layer.

In any of the preceding embodiments, the first layer has an inorganic particulate material/organic polymer weight ratio of about 60:40 to 80:20; and the second layer has an inorganic particulate material/organic polymer weight ratio of about 49:51 to 20:80, the first layer has an inorganic particulate material/organic polymer weight ratio in the range of about 60:40 to 70:30; and the second layer has an inorganic particulate material/organic polymer weight ratio in the range of about 49:51 to about 40:60.

In another aspect, a laminated electrochemical cell includes a positive electrode comprising a positive electrode current collector and a positive electrode active material layer disposed on one or both sides of the positive electrode current collector; a negative electrode comprising a negative electrode current collector and a negative electrode active material layer disposed on one or both sides of the negative electrode current collector; wherein at least one of the positive and negative electrodes comprises the electrode/separator assembly described herein above, and wherein the positive electrode and negative electrode are positioned in a facing relationship to form a laminate multilayer composite separator layer between the two opposite electrodes.

In any of the preceding embodiments, one of the positive or negative electrodes comprises the electrode/separator assembly described herein above, and optionally, the other of the positive or negative electrode comprises a monolayer composite separator layer attached to one or both sides of the electrode.

In any of the preceding embodiments, both of the electrodes comprise the electrode/separator assembly described herein above.

In another aspect, a laminated electrochemical cell includes a positive electrode comprising a positive electrode current collector, a positive electrode active material layer disposed on one or both sides of the positive electrode current collector; a negative electrode comprising a negative electrode current collector, a negative electrode active material layer disposed on one or both sides of the negative electrode current collector; and a porous multilayer composite separator layer comprising a first layer adjacent to one of either the positive or negative electrode and a second layer spaced apart from said positive or negative electrode by the first layer, the first and second layers comprised of an inorganic particulate material and a polymer material wherein the inorganic material is the predominant material in the first layer, and the polymer material is the predominant material in the second layer, wherein the positive electrode and negative electrode are positioned in a facing relationship to form a laminate multilayer composite separator layer between the positive and negative electrodes.

In any of the preceding embodiments, the electrochemical cell is a prismatic cell.

In any of the preceding embodiments, the laminate multilayer composite separator layer has a thickness of about 2 to 40 μm, or the laminate multilayer composite separator layer has a thickness of about 10 to 30 μm, or the laminate multilayer composite separator layer has a thickness of about 20 μm.

In any of the preceding embodiments, the first composite separator layer has an inorganic particulate material/organic polymer weight ratio of about 90:10 to about 60:40.

In any of the preceding embodiments, the first porous monolayer composite separator layer has an inorganic particulate material/organic polymer weight ratio of about 70:30 to about 60:40; and said second porous monolayer composite separator layer has an inorganic particulate material/organic polymer weight ratio of about 40:60 to about 49:51.

In any of the preceding embodiments, the organic polymer comprises a polymer which is electrochemically compatible with Li-ion cells.

In any of the preceding embodiments, the organic polymer is selected from the group consisting of polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly (vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers, polyacrylic acids and lithiated polyacrylic acids.

In any of the preceding embodiments, the inorganic particulate material is selected from the group consisting of silica, alumina, titania, natural and synthetic zeolites, metal carbonates, zirconia, silicon phosphates, silicates and other electrochemically stable inorganic particles of the appropriate particle size.

In any of the preceding embodiments, the inorganic particulate material has a particle size of about 4 nm to about 500 nm, or the inorganic particulate material has a particle size of about 10 to 20 nm, or the inorganic particulate material has a particle size of about 1 μm to about 6 μm.

In any of the preceding embodiments, the thickness of the multilayer composite separator layer is predominantly made up of the inorganic particulate material-rich layer.

In any of the preceding embodiments, the multilayer composite separator layer is bilayer composite separator layer.

In any of the preceding embodiments, the multilayer composite separator layer is bilayer composite separator layer and the thickness of the first layer is 10% to 90% of the total thickness of the bilayer composite separator layer, and the thickness of the second layer is 10% to 90% of the total thickness of the bilayer composite separator layer.

In any of the preceding embodiments, the multilayer composite separator layer is bilayer composite separator layer and the thickness of the first layer is 90% of the total thickness of the bilayer composite separator layer, and the thickness of said second layer is 10% of the total thickness of the bilayer composite separator layer.

In any of the preceding embodiments, the multilayer composite separator layer is bilayer composite separator layer and the thickness of said first layer is 80% of the total thickness of the bilayer composite separator layer, and the thickness of said second layer is 20% of the total thickness of the bilayer composite separator layer.

In any of the preceding embodiments, the multilayer composite separator layer is bilayer composite separator layer and the thickness of said first layer is 70% of the total thickness of the bilayer composite separator layer, and the thickness of said second layer is 30% of the total thickness of the bilayer composite separator layer.

In any of the preceding embodiments, the multilayer composite separator layer is bilayer composite separator layer and the first layer has an inorganic particulate material/organic polymer weight ratio of about 65:35 and the second layer has an inorganic particulate material/organic polymer weight ratio of about 45:55. And the thickness of the first layer is 80% of the total thickness of the bilayer composite separator layer, and the thickness of the second layer is 20% of the total thickness of the bilayer composite.

In any of the preceding embodiments, the multilayer nanocomposite separator is disposed on one of the electrodes.

In any of the preceding embodiments, the one electrode which does not have the multilayer composite separator attached have a monolayer composite separator layer attached to one or both sides of the electrode.

In any of the preceding embodiments, both of the electrodes have the multilayer composite separator attached to one or both sides of the electrodes.

In any of the preceding embodiments, the first and second porous monolayer composite separator layers have different inorganic particulate material/organic polymer weight ratio.

In any of the preceding embodiments, the organic polymer comprises a polyvinylidene fluoride-based polymer.

In any of the preceding embodiments, the inorganic particulate material is selected from the group consisting of silica, alumina, natural and synthetic zeolites and other electrochemically stable inorganic particles of the appropriate particle size.

In any of the preceding embodiments, the silica comprises fumed silica.

In any of the preceding embodiments, the silica comprises precipitated silica.

In another aspect, a method of making laminated electrochemical cell includes providing a positive electrode and a negative electrode in a facing relationship, one or both of the positive electrode and negative electrode having a porous multilayer composite separator layer disposed on the electrode; wherein the positive electrode comprises a positive electrode current collector and a positive electrode active material layer disposed on one or both sides of the positive electrode current collector; wherein the negative electrode comprises a negative electrode current collector and a negative electrode active material layer disposed on one or both sides of the negative electrode current collector; wherein said multilayer composite separator comprises at least first and second composite separator layers; each composite separator layer comprising inorganic particulate material(s) and organic polymer(s) with different inorganic particulate material/organic polymer weight ratios; said first composite separator layer adjacent to the electrode containing a higher weight percentage of the inorganic particulate material and lower weight percentage of the organic polymer than a second composite separator layer positioned outermost from the electrode; and laminating the positive electrode and negative electrode in a facing relationship under certain pressure and temperature to form a laminate multilayer composite separator layer between the positive and negative electrodes.

In another aspect, a method of making laminated electrochemical cell includes providing a positive electrode comprising a positive electrode current collector, a positive electrode active material layer disposed on one or both sides of the positive electrode current collector, and a first porous monolayer composite separator layer attached to one or both sides of the positive electrode; providing a negative electrode comprising a negative electrode current collector, a negative electrode active material layer disposed on one or both sides of the negative electrode current collector and a second porous monolayer composite separator layer attached to one or both sides of the negative electrode; wherein the said first and second porous monolayer composite separator layers comprise inorganic particulate material(s) and organic polymer(s); and laminating the positive electrode and negative electrode in a facing relationship under certain pressure and temperature to form a laminate multilayer composite separator layer between the two opposite electrodes.

In any of the preceding embodiments, laminating does not require any solvent and the electrodes are laminated at 100-200° C. and under a pressure of 200-700 psi, or the electrodes are laminated at about 160° C. and under a pressure of about 500 psi.

In any of the preceding embodiments, laminating requires a solvent system and the electrodes are laminated at 50-100° C. and under a pressure of 20-100 psi, or the electrodes are laminated at about 75° C. and under a pressure of about 50 psi.

In any of the preceding embodiments, the multilayer composite separator on one of the electrodes is lightly misted with a solvent system before laminated with an opposite electrode.

In yet another embodiment, the lamination is conducted using a solvent system including N-methylpyrrolidone.

In any of the preceding embodiments, the multilayer composite separator on one of the electrodes is contacted with a solvent system before laminated with an opposite electrode.

A portable electronic device comprising a laminated electrochemical cell of according to any of the preceding embodiments is also provided.

In one aspect, a portable electronic device including a laminated electrochemical cell is described. The laminated electrochemical cell includes a positive electrode and a negative electrode. The positive electrode includes a positive electrode current collector and a positive electrode active material layer disposed on one or both sides of the positive electrode current collector. The negative electrode includes a negative electrode current collector and a negative electrode active material layer disposed on one or both sides of the negative electrode current collector. At least one of the positive and negative electrodes has a porous multilayer nanocomposite separator layer disposed on one or both sides of the electrode. The multilayer nanocomposite separator layer comprises at least two nanocomposite layers and each nanocomposite layer includes inorganic particulate material(s) and organic polymer(s) having different inorganic particulate material/organic polymer weight ratios. A first layer of the multilayer nanocomposite separator layer having a first weight percent of polymer is disposed over the electrode. And a second layer containing a higher weight percentage of organic polymer than the first layer is disposed as the outermost layer of the multilayer nanocomposite separator layer. The positive electrode and negative electrode are positioned in a facing relationship to form a laminate multilayer nanocomposite separator layer between the two opposite electrodes.

In one aspect, a portable electronic device including a laminated electrochemical cell is described. The laminated electrochemical cell includes a positive electrode and a negative electrode. The positive electrode includes a positive electrode current collector, a positive electrode active material layer disposed on one or both sides of the positive electrode current collector, and a first porous monolayer nanocomposite separator layer attached to one or both sides of the positive electrode. The negative electrode includes a negative electrode current collector, a negative electrode active material layer disposed on one or both sides of the negative electrode current collector, and a second porous monolayer nanocomposite separator layer attached to one or both sides of the negative electrode. The positive electrode and negative electrode are positioned in a facing relationship to form a laminate multilayer nanocomposite separator layer between the two opposite electrodes. The first and second porous nanocomposite separator layers include inorganic particulate material(s) and organic polymer(s).

As used herein, "cathode" and "positive electrode" are used interchangeably. Also as used herein, "anode" and "negative electrode" are used interchangeably.

Also, as used herein, "particle size" refers to the aggregate particle size. Aggregate particle refers to of fused primary particles. Aggregate particle size refers to the average maximum dimension of the aggregate particles and not the primary particles making up the aggregate particle. Aggregates are further distinguished from agglomerates, which are loose associations of aggregates that can be readily dispersed.

As used herein, "inorganic filler" and "inorganic material" are used interchangeably.

As used herein, "inorganic filler-rich" refers to the composition wherein the weight ratio of inorganic filler/polymer is more than 1:1. Also as used herein, "polymer-rich" refers to the composition wherein the weight ratio of inorganic filler/polymer is less than 1:1.

BRIEF DESCRIPTION OF THE DRAWING

The invention is described with reference to the figures listed below, which are presented for the purpose of illustration only and are not intended to be limiting of the invention.

DETAILED DESCRIPTION

Figure 1:
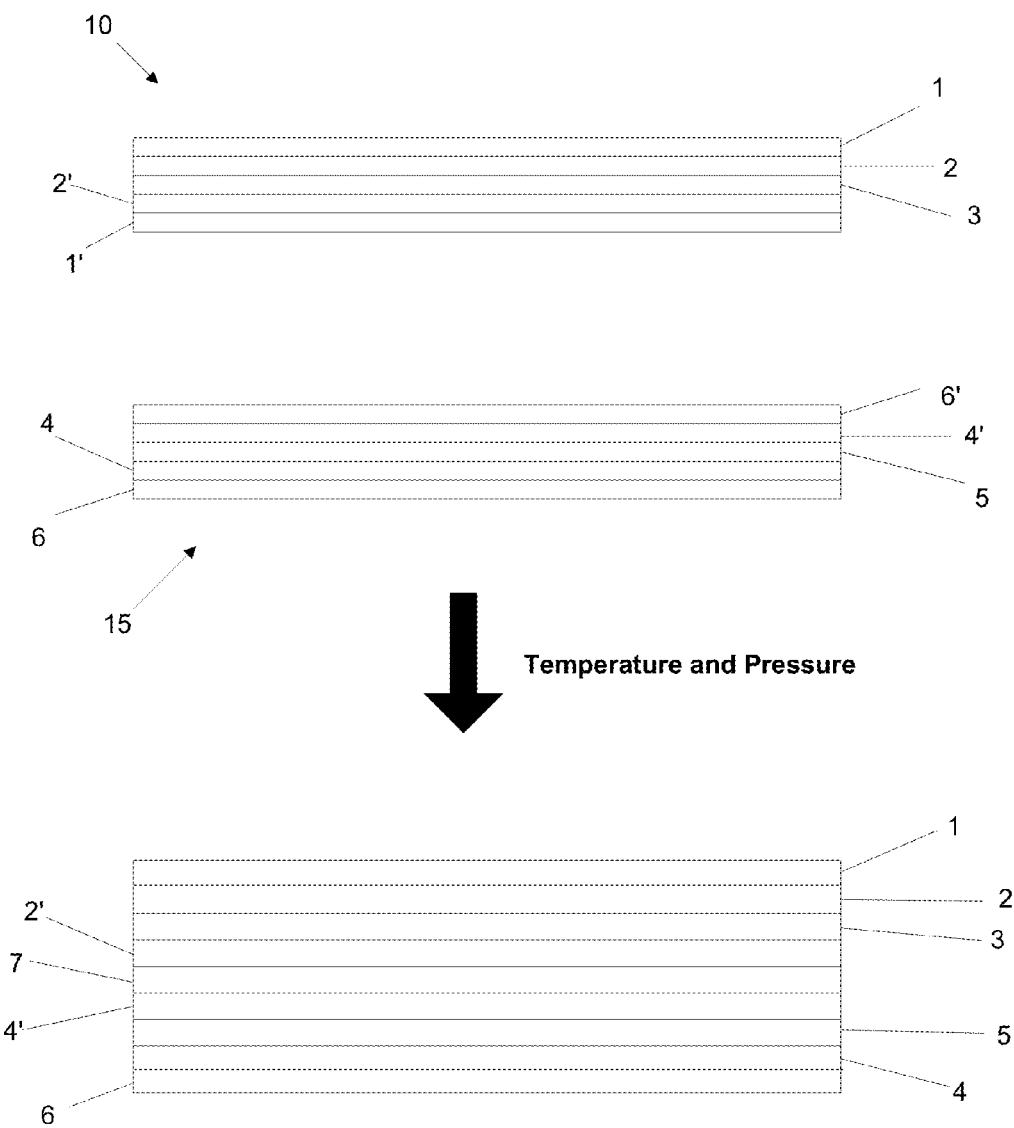
FIG. 1 is a schematic illustration of a lamination process of a cathode and an anode in which both the cathode and the anode contain a bilayer composite separator according to one or more embodiments of the invention.

A bilayer composite separator which is easy to laminate and has good lamination strength, porosity and conductivity is described. The bilayer composite separator can be used as a separator layer in an electrochemical device such as a battery, for example, a secondary Li ion prismatic battery. The two layers in the composite separator have different inorganic material/polymer weight ratios and thus capitalize on the ease of lamination of the polymer-rich composite separator layer while maintaining the safety and cell performance characteristics of the inorganic material-rich composite separator layer. The composite separator layer that includes this bilayer feature results in easy lamination, good lamination strength, and good battery cell performance. For the purpose of discussion below, reference is made to bilayer composite separators; however, composite separators having single or multiple layers are contemplated.

Reference is variously made herein to "composite," "microcomposite," and "nanocomposite" separator layers; however, the multilayer structure can include composites of particle sizes ranging from nanoscale to microscale such as the composite separators described in U.S. patent application Ser. No. 12/196,203, filed Aug. 21, 2008 and entitled "SEPARATOR FOR ELECTROCHEMICAL CELL AND METHOD FOR ITS MANUFACTURE," and U.S. Patent Application No. 61/262,311 filed Nov. 18, 2009 and entitled "COMPOSITE SEPARATOR FOR ELECTROCHEMICAL CELL AND METHOD FOR ITS MANUFACTURE," which are incorporated in their entirety by reference. Reference to any particular embodiment as either a nanocomposite or microcomposite is not intended to limit the description to particles of any particular size unless specifically so indicated.

A porous multilayer composite separator includes inorganic particles substantially uniformly distributed in a polymer matrix. Each composite separator layer of the multilayer composite separator includes inorganic particles and organic polymer in different inorganic/organic weight ratios. The composite separator can be used as an electronically insulating/ionically conducting layer between the anode and the cathode of an electrochemical cell. The bilayer composite separator is disposed on an electrode so that the outermost composite separator layer, i.e., the layer furthest from the electrode and the layer which creates the new interface, has the higher organic polymer content. The polymer is selected to have a glass transition temperature and/or a melting temperature that permits the organic polymer to soften or flow under application of heat and/or pressure. The organic polymer content of the high polymer content layer, e.g. "polymer-rich layer", is selected to promote lamination with an adjacent surface. Lamination occurs when the polymer from different separator layers 'flow', a mechanism which requires movement of the polymer. Thus "soft polymers", e.g., polymers with low $T_g$ (glass transition temperature), promote lamination. The remaining layers are selected to provide high mechanical strength, high conductivity and other properties that are desirable in a battery separator. Thus, the polymer-rich separator layers are easy to laminate and provide superior lamination strength under mild conditions, while the inorganic particle-rich separator layers provide good porosity and conductivity to the cell, and electrochemical performance of the cell.

A laminated electrochemical cell is provided in which the outward facing, higher polymer content composite layer is laminated to an adjacent surface of a second electrode. The second electrode can be untreated, e.g., without a bilayer composite separator, or can also include a bilayer or monolayer composite separator. However lamination is achieved most readily by fusing together the polymers in adjacent polymer-rich composite separator layers. In addition fusion is also enabled by a solvent assisted method. The fusion can be achieved with a solvent-assisted technique at moderate temperatures and pressures, or higher temperatures and pressures using a 'dry' lamination process (without the use of any solvents). The lamination technique does not require a separate adhesive layer to the cell, so that the weight, volume and cost are kept to a minimum.

Reference is made to FIG. 1, which illustrates an exemplary lamination process of a cathode and an anode. As illustrated in FIG. 1, cathode 10 includes a cathode current collector 3 and a layer of cathode active material 2, 2' disposed on each side of the cathode current collector 3. Bilayer composite separator 1, 1' are disposed on both sides of the cathode and are in contact with the cathode active material 2, 2', respectively. Similarly, anode 15 includes an anode current collector 5 and a layer of anode active material 4, 4' disposed on each side of the anode current collector 5. Bilayer composite separator 6, 6' are disposed on both sides of the anode and in contact with the anode active material 4, 4', respectively. During the lamination process, cathode 10 and anode 15 are positioned so that bilayer 1' of cathode 10 and bilayer 6' of anode 15 are in facing relationship. The outermost layers of the bilayers 1' and 6' have a high organic polymer content. Pressure is applied at an appropriate temperature and the cathode and the anode are pressed against each other so that the two bilayer composite separator 1' and 6' form a laminated composite separator layer 7. As is discussed in greater detail below, the lamination process provides a robust and mechanically strong spacer between the two electrodes while maintaining a high degree of conductivity.

The cathode and/or the anode active layer typically include a porous particulate composite including an electrode active material, a conductive additive and a polymer binder. The laminate composite separator layer 7 separates the electrode layers. A liquid electrolyte permeates the porous layer of composite separator layer 7. The current collector is in contact with its respective electrode layer to permit current flow during charge and discharge cycles of the electrochemical cell. The cells may be stacked or wound together to form a prismatic or spirally wound battery. Other embodiments that require alternating placement of anode and cathode layers are also contemplated. In the illustrated case, both sides of the electrode current collector are coated with an electroactive layer. However, a current collector for cathode or anode with electrode active material and bilayer composite separators 1, 6 attached to only one side is also contemplated. Furthermore, although in the illustrated case, two bilayer composite separators 1', 6' are laminated together to form the laminated composite separator 7, a cathode/anode with a bilayer composite separator 1 could also be laminated to an opposing electrode without any separator layer. For example, a composite bilayer with a polymer-rich outer layer can be laminated to either a bare electrode or to an electrode that has been coated with a monolayer of a composite separator material, e.g., a polymer-rich monolayer of composite separator material.

In some embodiments, the laminated composite separator 7 has a thickness of about 2-40 μm. In some embodiments, the laminated composite separator 7 has a thickness of about 10-30 μm. In some embodiments, the laminated composite separator 7 has a thickness of about 20 μm.

Figure 2:
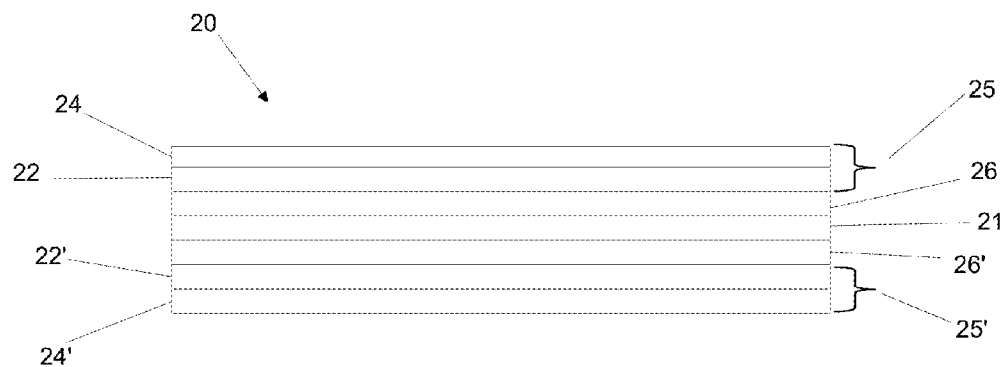
FIG. 2 is a schematic illustration of an electrode with a bilayer composite separator attached to each side.

The structure of the bilayer composite separator according to one or more embodiments is further illustrated in FIG. 2, using an exemplary electrode 20. Electrode active materials layers 26 and 26' are attached to current collector 21. The bilayer composite separator 25 includes inorganic filler-rich composite separator layer 22 and organic polymer-rich composite separator layer 24. Inorganic filler-rich composite separator layer 22 is directly attached to the active material layer 26 of electrode 20. Organic polymer-rich composite separator layer 24 is adjacent to 22, on a face opposing electrode active material layer 26. The bilayer composite separator 25' includes inorganic filler-rich composite separator layer 22' and organic polymer-rich composite separator layer 24'. In a similar manner, 22' and 24' are coated onto the opposite side of the electrode. Composite separator layers 22 and 24 (also 22' and 24') have different inorganic material/polymer weight ratios and thus have different lamination properties and result in different cell performance characteristics. The composite separator layer 22 or 22' is inorganic material-rich and thus has good porosity, good conductivity and good cell performance characteristics; and the composite separator layer 24 or 24' is polymer-rich and thus is easy to laminate under conditions that do not result in significant loss of conductivity and/or porosity.

The proportions of polymer and inorganic materials in the inorganic filler-rich composite separator layer 22 may vary over a relatively wide range. In some instances, the ratio of inorganic filler to polymer may range, on a weight basis, from 95:5 to 51:49. In some instances, the ratio of inorganic filler to polymer may range, on a weight basis, from 80:20 to 60:40. In some embodiments, layer 22 is inorganic filler-rich and has an inorganic filler/polymer weight ratio of about 55:45. In some embodiments, layer 22 has an inorganic filler/polymer weight ratio of about 60:40. In some embodiments, layer 22 has an inorganic filler/polymer weight ratio of about 65:35. In some embodiments, layer 22 has an inorganic filler/polymer weight ratio of about 70:30. In some embodiments, layer 22 has an inorganic filler/polymer weight ratio of about 80:20. In some embodiments, layer 22 has an inorganic filler/polymer weight ratio of about 80:20.

The proportions of polymer and inorganic materials in the polymer rich composite separator layer 24 can also vary. In some instances, the ratio of inorganic filler to polymer may range, on a weight basis, from 49:51 to about 5:95. In some embodiments, layer 24 is polymer-rich has an inorganic filler/polymer weight ratio of about 45:55. In some embodiments, layer 24 has an inorganic filler/polymer weight ratio of about 40:60. In some embodiments, layer 24 has an inorganic filler/polymer weight ratio of about 35:65. In some embodiments, layer 24 has an inorganic filler/polymer weight ratio of about 30:70. In some embodiments, layer 24 has an inorganic filler/polymer weight ratio of about 20:80. In some embodiments, layer 22 has an inorganic filler/polymer weight ratio of about 20:80.

The composite bilayer can be made up of predominantly the inorganic filler-rich layer 22. In some embodiments, the thickness of layer 22 and layer 24 are 90% and 10% of the total thickness of the bilayer composite separator 25, respectively. In some embodiments, the thickness of layer 22 and layer 24 are 80% and 20% of the total thickness of the bilayer composite separator 25, respectively. In some embodiments, the thickness of layer 22 and layer 24 are 70% and 30% of the total thickness of bilayer composite separator 25, respectively. In some embodiments, the thickness of layer 22 and layer 24 are 60% and 40% of the total thickness of the bilayer composite separator 25, respectively. In some embodiments, the thickness of layer 22 and layer 24 are 50% and 50% of the total thickness of the bilayer composite separator 25, respectively. In some embodiments, the thickness of layer 22 and layer 24 are 40% and 60% of the total thickness of the bilayer composite separator 25, respectively. In some embodiments, the thickness of layer 22 and layer 24 are 30% and 70% of the total thickness of the bilayer composite separator 25, respectively. In some embodiments, the thickness of layer 22 and layer 24 are 20% and 80% of the total thickness of the bilayer composite separator 25, respectively. In some embodiments, the thickness of layer 22 and layer 24 are 10% and 90% of the total thickness of the bilayer composite separator 25, respectively.

In a particular embodiment, layer 22 has an inorganic filler/polymer weight ratio of about 70:30 to about 60:40, e.g., about 65:35 and layer 24 has an inorganic filler/polymer weight ratio of about 49:51 to about 40:60, e.g., about 45:55.

In a particular embodiment, layer 22 has an inorganic filler/polymer weight ratio of about 65:35 and a thickness of 8 μm and layer 24 has an inorganic filler/polymer weight ratio of about 45:55 and a thickness of 2 μm.

The bilayer composite separator layer can be applied to any substrate. It can be applied at the desired total thickness to one electrode, or both the anode and the cathode may be coated with a bilayer composite separator layer, of the same or different composition and thicknesses. The laminated composite separator layer 7 can have a thickness in the range of 2-40 µm. In those instances where both the cathode and anode are coated with a porous bilayer composite separator, the amount deposited from each layer can be reduced. For example, where it is desired to form a laminated composite separator layer 7 of about 20 µm, both the cathode and the anode can be coated to form a bilayer composite separator with a thickness that is substantially half the desired amount; alternatively the thicknesses of the bilayer composite separator on the cathode and the anode can be varied so long as the resulting laminated composite separator layer 7 has the desired final thickness of the separator, e.g., about 20 µm thick. It is desirable to have the bilayer composite separator layer to be as thin as possible, as this increases ionic conductivity and increases volumetric and gravimetric capacity in the cell. In order to improve conductivity, the porosity of the separator is desirably high. However, porosity should not result at the expense of mechanical strength or ionic conductivity. Composites that employ a bilayer composite separator can provide both ionic conductivity and mechanical strength.

Figure 3:
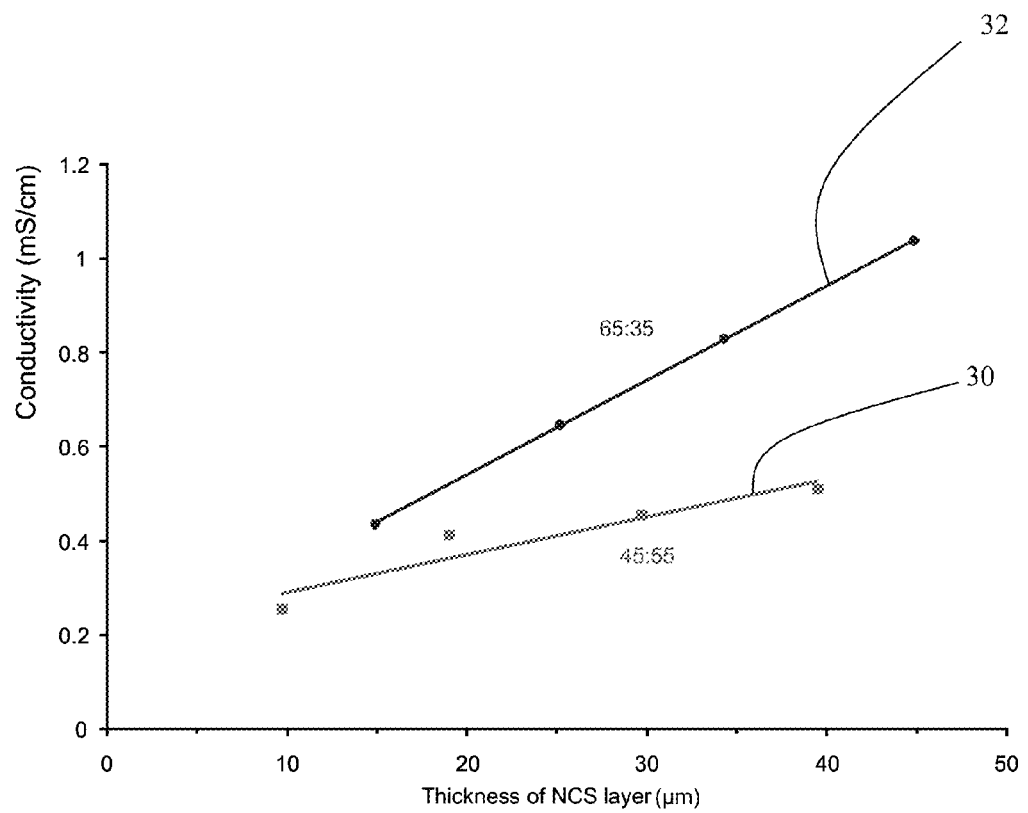
FIG. 3 is a plot of the conductivity of nanocomposite separator coatings as a function of thickness and polymer content of the separator coatings.
Figure 4:
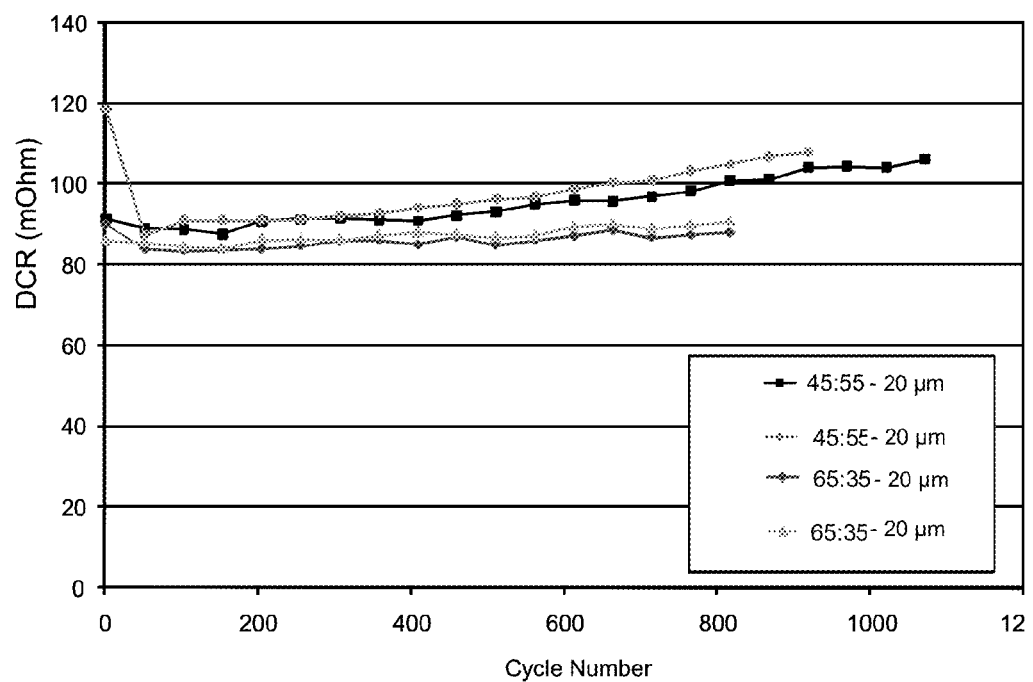
FIG. 4 is a plot of direct current resistance (DCR) measurements of prismatic cells separated by 20 μm nanocomposite separator with varying polymer content (polymer-rich 45:55 (inorganic filler/polymer weight ratio) nanocomposite separator and inorganic filler-rich 65:35 (inorganic filler/polymer weight ratio)).

Since the movement of polymer in the nanocomposite separator is a feature of the lamination mechanism, it is facilitated by increasing the polymer content in the composite separator layer. However, the electrochemical performance of composite separators decreases with increasing polymer content. FIG. 3 illustrates the material conductivity of nanocomposite separators having different fumed silica particle/polyvinylidene fluoride (PVdF) weight ratios. Note that the polymer-rich 45:55 (fumed silica:PVdF weight ratio) nanocomposite separator (curve 30) has lower conductivity than the inorganic filler-rich 65:35 (fumed silica:PVdF weight ratio) (curve 32) nanocomposite separator. Without being bound by any particular mode or theory of operation, it is believed that polymer-rich composite separators usually have less porosity and therefore are less conductive than inorganic filler-rich composite separators. FIG. 4 shows the measurement of the direct current resistance (DCR) of prismatic cells, with two cells separated by 20 µm of polymer-rich 45:55 (fumed silica:PVdF weight ratio) nanocomposite separator and two cells separated by inorganic filler-rich 65:35 (fumed silica:PVdF weight ratio) nanocomposite separator. The results illustrate that the two prismatic cells separated by 20 µm of polymer-rich 45:55 (fumed silica:PVdF weight ratio) nanocomposite separator show more direct current resistance than the inorganic-rich 65:35 nanocomposite separator.

These results suggest a trade-off between lamination and electrochemical performance. As FIG. 3 and FIG. 4 illustrate, a cell with a 65:35 (fumed silica:PVdF weight ratio) nanocomposite separator formulation performs better in cycling/electrochemical test than one with a 45:55 (fumed silica:PVdF weight ratio) nanocomposite separator formulation. However, a 45:55 (fumed silica:PVdF weight ratio) nanocomposite separator laminates faster, at lower pressure and temperature with greater strength (as defined by resistance of the laminated layers to be pulled apart) than a 65:35 (fumed silica:PVdF weight ratio) nanocomposite separator.

In some embodiments, multilayer composite separator layers in which the composite separator composition is varied are used to balance these trade-offs. The bilayer composite separators capitalize on the ease of lamination of the polymer-rich composite separator formulation while maintaining the safety and cell performance characteristics of the inorganic filler-rich formulation. The thickness of the bilayer composite separator as well as its component layers (inorganic filler-rich layer and polymer-rich layer) can be varied, as long as the resulting laminated composite separator layer has a desired thickness, e.g., in the range of about 2-40 µm. In one or more embodiments, the polymer-rich separator layer has a thickness of about 1-20% of the total thickness of the multilayer composite separator. In other embodiments, the polymer-rich separator layer has a thickness of about 5-20% or about 10-20% of the total thickness of the multilayer composite separator. The remaining of the multilayer composite separator is occupied by one or more inorganic filler-rich composite separator layers. Specifically, in one embodiment, an 8 µm layer of the 65:35 (fumed silica:PVdF weight ratio) composite separator was applied to an electrode which was subsequently coated with a 2 µm layer of the 45:55 (fumed silica:PVdF weight ratio) composite separator, for a bilayer composite separator with a total thickness of 10 µm.

In addition to lamination strength and ease of lamination, loss of porosity through compaction of the separator layer during lamination was investigated and the percent compaction was observed to be less than about 10%. The percent compaction can be much less and can be less than about 0.6%, or less than about 0.4%, or less than about 0.3% during wet lamination. Dry lamination, which typically requires higher pressures, temperatures and/or lamination time, demonstrates cell compaction of less than about 10%. The percent compaction can be less than about 4%, or less than about 2.4% during dry lamination. In one or more embodiments, the porosity reduction during lamination is less than about 5%. In one or more embodiments, the porosity reduction during lamination is less than about 3%. In one or more embodiments, the porosity reduction during lamination is less than about 1-2%. The percent compaction is defined as the percent change in the thickness of the electrode stack after lamination (Equation 1).

$$\text{Percent Compaction} = \left( \frac{\text{Initial Electrode Stack Thickness} - \text{Final Electrode Stack Thickness}}{\text{Initial Electrode Stack Thickness}} \right) \times 100$$

Figure 5:
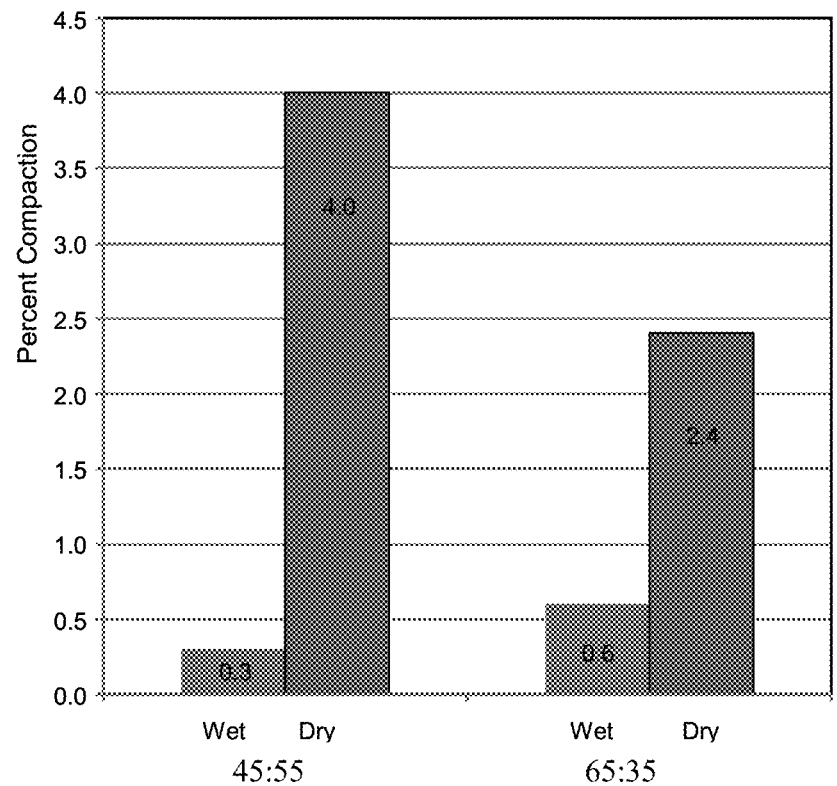
FIG. 5 illustrates the comparison of the percent compaction of single layer cells laminated wet versus dry and polymer-rich 45:55 (inorganic filler/polymer weight ratio) nanocomposite separator versus inorganic filler-rich 65:35 (inorganic filler/polymer weight ratio) nanocomposite separator.
Figure 6:
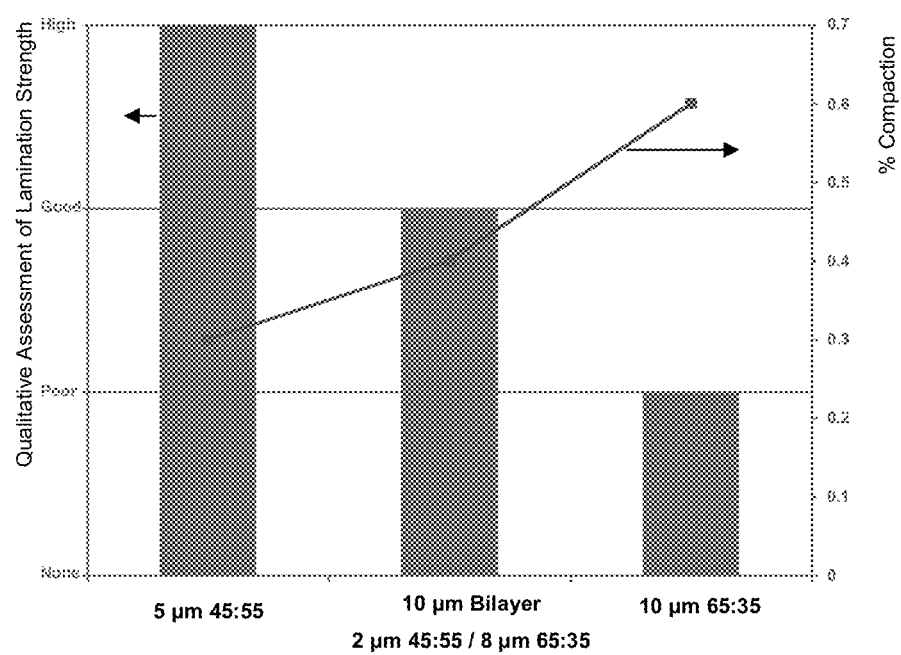
FIG. 6 illustrates a qualitative assessment of the lamination strength of different nanocomposite separator formulations and the total percent compaction of the associated cell.

When laminating dry, e.g., without the addition of any solvents during the lamination process, the percent compaction is much higher than the percent compaction during solvent assisted lamination. The solvent assist method involves spraying a light mist of a good solvent for the polymer such as PVDF, for example N-methylpyrrolidinone (NMP), onto the composite separator coating to reduce the Tg of the binder at the interface. FIG. 5 shows that in the case of a 45:55 (fumed silica:PVdF weight ratio) nanocomposite separator cell, a dry lamination leads to thirteen times the compaction which occurs during wet lamination. A similar trend is observed for a 65:35 (fumed silica:PVdF weight ratio nanocomposite separator cell). FIG. 6 illustrates the percent compaction of the cell during the solvent assisted lamination (wet with NMP, 1 minute temperature equilibratum, lamination at 75° C., 50 psi, 3 minutes). The percent compaction is lowest for the cell containing the polymer-rich nanocomposite separator layer (0.3%) and highest for the inorganic filler-rich nanocomposite separator layer cell (0.6%) with the bilayer nanocomposite separator in between (0.4%). The compaction of the separator layers affects the porosity of the separator as defined in Equation 2.

$$NCS\ Porosity_{final} = NCS\ Porosity_{initial} \left( \frac{Final\ Electrode\ Stack\ Thickness}{Initial\ Electrode\ Stack\ Thickness} \right)$$

When the bilayer nanocomposite separator type cell is used, the relative porosity reduction (as defined by Equation 3) is 1-2%, assuming 100% of the compaction occurs in the nanocomposite separator layer.

$$Relative\ Porosit\ Reduction = \left( \frac{NCS\ Porosity_{initial} - NCS\ Porosity_{final}}{NCS\ Porosity_{initial}} \right) \times 100$$

Also shown in FIG. 6 is a qualitative assessment of the lamination strength of each nanocomposite separator formulation in cells laminated using the solvent assist method. The volume of solvent applied in this method is low—just enough to wet the nanocomposite separator layer. A polymer-rich 45:55 (fumed silica:PVdF weight ratio) nanocomposite separator laminates more readily and has more lamination strength than the inorganic filler-rich 65:35 (fumed silica:PVdF weight ratio) formulation. The bilayer nanocomposite separator cell shows lamination strength intermediate to the two monolayer nanocomposite separators.

Figure 7:
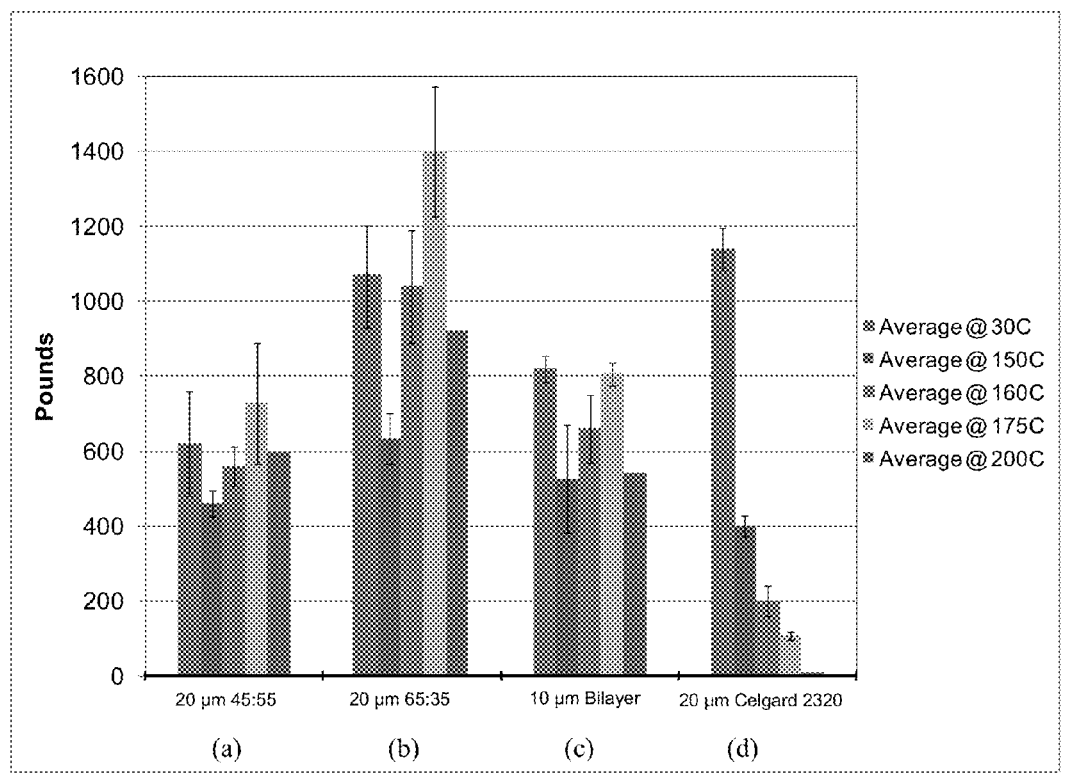
FIG. 7 illustrates thermo-mechanical testing results, an approximation for the puncture resistance of a separator layer by a foreign material in the cell, for (a) polymer-rich 45:55 (inorganic filler/polymer weight ratio) nanocomposite separator, (b) inorganic filler-rich 65:35 (inorganic filler/polymer weight ratio) nanocomposite separator, (c) a bilayer nanocomposite separator and (d) polyolefin baseline at different temperatures.

FIG. 7 demonstrates the results of thermomechanical tests, which measure the resistance of cell to the puncturing of separators at varying temperatures. The 10 µm bilayer nanocomposite separator shows resistance values lower than the inorganic filler-rich nanocomposite separator but higher than the polymer-rich nanocomposite separator at various temperatures, when these films are 20 µm. Regardless of the resistance variation resulting from differences in the thickness of the nanocomposite separator films, these measurements show that the bilayer nanocomposite separator structure has high strength. This result suggests that a bilayer composite separator provides a sufficient mechanical separation between electrodes (in particular in comparison to conventional polyolefin separators), even at quite elevated temperatures. In addition, a laminated composite separator layer in a cell can include two layers, e.g., two 10 µm composite separator bilayers, further increasing the cell's durability and resistance to physical separation. The multilayer separator can also include three or more layers of different composition, for example, layers with increasing polymer content as the layer approach the outermost lamination layer.

There are a number of materials which can be used in the preparation of porous composite separator layers. Suitable polymers have a glass transition temperature or melt temperature in the range suitable for lamination of the battery components, e.g., 40° C. to 200° C. In addition, polymers are selected from those polymers which are compatible with the chemistry of a particular battery system. The polymer should be electrically insulating, should have low solubility in electrolyte solvents and be chemically and electrochemically stable in the cell. The polymer may be a single polymer or a mixture of polymers. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers, polyacrylic acids and lithiated polyacrylic acids. One group of polymers having utility in lithium and lithium ion battery systems, as well as other battery systems, includes fluorinated polymers and latex polymers such as styrene butadiene and other styrene-based polymers. Latex polymer systems tend to form polymer suspensions and may not be solubilized in the liquid carrier. Polyvinylidene fluoride polymer compositions including polyvinylidene fluoride copolymers and terpolymers are one group of polymers having specific utility. There are a variety of such materials known and available in the art, and such materials may comprise essentially homogeneous PVDF as well as blends and copolymers. One particular material is a PVDF material sold under the trademark Kureha 7208. Other equivalent and similar materials may likewise be employed.

The inorganic filler component is selected from a variety of natural and artificial materials that are compatible with the particular battery systems and chemistry in which the layers are to be incorporated. Mixtures of two or more suitable inorganic filler components are contemplated. The inorganic component may be a ceramic material. One particular group of ceramic materials comprises silica, with fumed silica being one specific form of silica which may be employed. Fumed silica is a high surface area, generally high purity silica material. Fumed silica is often hydrophilic and can be wetted easily by most electrolyte solvents and many polar polymers. A material which has been used in one or more embodiments has a surface area of approximately 200 m$^2$/g. The particles are very small and typically are less than 500 nm in diameter, or less than 200 nm in diameter, and more typically about 10-20 nm. In one or more embodiments, the ceramic material is fumed silica having a narrow particle size distribution and a substantially spherical shape. Fumed silica can be prepared in a carefully controlled reaction of silicon tetrachloride (SiCl$_4$) that results in a highly controllable and narrow particle size distribution. In one embodiment, a fumed silica having a particle size of about 14 nm may be employed.

Inorganic filler particles having an average aggregate particle size in the micrometer range also can be used to form a composite layer with high porosity, high ionic conductivity at thicknesses of greater than 20 µm. The inorganic particles have an average particle size with a maximum dimension of about 1 µm to about 6 µm, or about 2 µm to about 6 µm, or about 3 µm to about 4 µm. In one or more embodiments the ceramic material is precipitated inorganic, e.g., ceramic, having a wide particle size distribution and variable shape, e.g., including spherical, elliptical and very randomized.

In one or more embodiments, the inorganic filler particles include silica having an average particle size of about 1 µm to about 6 µm, or about 2 µm to about 6 µm, or about 3 µm to about 4 µm. One particular silica having an average particle size of 3.3-4.0 µm is sold under the trademark Syloid C803 by W.R. Grace. The average aggregate particle size of precipitated silica according to one or more embodiments of the invention is significantly larger than fumed silica, which typically has an aggregate size less than 0.5 microns and on the range of 100 nm.

Other silicon compounds may be utilized as a ceramic component of the layers, such as for example, polyhedral oligomeric silesquioxane (POSS), which in the context of this disclosure is considered to be a ceramic material. Other ceramic materials include natural and synthetic zeolites, alumina, titania and the like. In addition, other electrochemically stable inorganic particles of appropriate size can be used, e.g., MgO, CaCO$_3$ and other metal carbonates, zirconia, silicon phosphates and silicates. The ceramic materials may be used either singly or in combination, with uniform or mixed sizes and shapes as well. The particles can be nanometer scale or micrometer scale.

Each separator layer in the bilayer composite separator layer 25, e.g., 22 and 24, is a porous composite material including inorganic filler (or ceramic) particles and polymer, wherein 22 and 24 have different inorganic filler/polymer weight ratios. The separator layer 22 or 24 is formed from a highly uniform distribution of inorganic filler material and polymer, that is, there is no discernible unevenness in the distribution of polymer and an inorganic filler material throughout the individual layer. There are substantially no regions of the individual layer having discernible regions of predominantly polymer or ceramic material.

The coating solution for a composite separator layer including inorganic filler, polymer, and solvent with desired ratio is coated onto at least one surface of an electrode material. The thickness of the layer coated onto the electrode will depend upon the particular composition of the coating solution and the final thickness desired in the electrochemical cell. Other coating techniques may be employed according to one or more embodiments of the invention, so long as they are susceptible to depositing a composition including a mixed ceramic and particle composition. Exemplary techniques includes doctor blading, roll coating, slot die coating, ink jet printing, spin coating, gravure coating and screen printing, or other coating methods. Coating is typically carried out under conditions that provide for solvent welding between the separator layer and the adjacent electrode layer. See copending U.S. application Ser. No. 12/196,203, entitled "Separator For Electrochemical Cell And Method For Its Manufacture," for further detail.

In one or more embodiments, composite layers are deposited simultaneously using extrusion coating processes, for example, slot die techniques. Extrusion coating involves extruding a layer of the coating solution from a slot die onto a moving web of the electrode material, which is then treated to remove the solvent and form a porous composite layer. By co-extruding coating solutions of different compositions through multiple slot dies individually extruded coating solutions are brought together as a multi-layer film.

In one or more embodiments, composite layers are deposited sequentially, so that the composition of each layer can be individually controlled and/or adjusted. By way of example, a first coating composition having a high inorganic content is first deposited on an electrode surface. The layer may be deposited in one or more steps to provide the desired thickness without stress or cracking. A second coating compositions having a high organic polymer content is then deposited on the first layer. The second layer may be deposited in one or more steps to provide the desired thickness without stress or cracking. Additionally the two compositions may be simultaneously deposited in a split die which feeds two slurries of different compositions.

In one or more embodiments, coating may be accomplished by spraying one or more coats of the applicator coating solution thereonto. By way of example, the composite separator layer 22 or 24 may be applied in about 3 to 5 coating steps, each coating step applying about ⅓ to ⅕ of the total separator layer thickness. Multipass deposition reduces solvent penetration into the electrode porous layer and can help reduce delamination. It has been surprisingly found that the application of the separator layer in multiple steps significantly reduces the number of defects formed in the final layer. Defects are defined as large pores having dimensions greater than one micron, or cracks in the film. The depositions steps need not apply layers of similar thickness. Thus, a first coating step can deposit a layer of a first thickness and a second step can deposit a layer of a second, different thickness.

The solvent system used in the preparation of the coating solution for composite separators may comprise any solvent system in which at least one component of the coating solution is capable of dissolving the polymer component. Suitable second or further components may be used; if not capable of dissolving the polymer, the additional components are highly miscible with the first solvent. Preferably, the solvents are relatively easy to remove during subsequent processing steps. One solvent which has been found to have utility in connection with PVDF-based layers includes N-methylpyrrolidinone (NMP), and NMP may be blended with another solvent such as acetone, ethyl acetate, and propyl acetate for example, to obtain the appropriate slurry rheology. By way of example, solvents of different boiling points may be used to control solvent evaporation rates and thus film stresses which are generated during drying of the liquid slurry. One specific solvent mixture which was utilized in one implementation of the present invention comprised, on a volume basis, a 30:70 NMP/acetone mixture. Others include 30% NMP with 70% of propyl acetate, methyl ethyl ketone (MEK), or ethyl acetate. The composite slurry is a relatively homogeneous suspension which is relatively stable in the absence of shear.

Following the coating, the solvent is removed from the coating mixture to leave a solid porous body of polymer/ceramic particles on the electrode. The solvent may be removed by evaporation, and this evaporation may be fostered by use of heating and/or low pressure conditions. In some instances, the solvent may be extracted by the use of an extraction solvent which is a non-solvent for the polymer. Such techniques are known in the art. In one or more embodiments, the solvent optionally may be removed after each spray coating step, so that multiple solvent removal steps may be conducted when multiple spray coating steps are used.

In one or more embodiments, after coating a coating onto the support, the layer is subjected to a treatment selected to reduce the stress in the layer by curing the layer. The polymers may be cured by treatment above their glass transition or melting temperature so as to modify or enhance its physical properties. Curing may be accomplished by heating, as is known in the art. The drying step and the curing step may or may not be carried out in serial steps. In the case of thermoplastic polymers, such as PVDF, curing is accomplished by heating the composite beyond the host polymer $T_m$ and then allowing it to cool down. In other embodiments, the layer is heated at or above the glass transition temperature of the polymer binder.

In one or more embodiments, layer 22 is coated first onto the electrode utilizing a coating solution with a polymer and an inorganic filler material dispersed in the solvent. Application of the components of separator layer 22 from a solution onto the electrode layer provides a durable bond between the two layers. The precursor solution of separator layer 22 is coated onto a surface of an electrode so as to form a liquid layer. The solvent is removed from this layer leaving a porous solid body comprised of the polymer and the ceramic material. And then this polymer is optionally cured by heating for a period of time to a temperature greater than the polymer melt temperature ($T_m$) or glass transition temperature ($T_g$). As a result, the separator layer 22 is directly bonded to the surface of the electrode, so that the composite separator layer has unusually good adhesion to the electrode active layer. This excellent adhesion improves performance by reducing interfacial resistance between the electrodes and the separator layer. Subsequently, layer 24 is coated onto 24 utilizing a coating solution with a polymer and an inorganic filler material dispersed in the solvent following the similar coating protocols. The precursor solutions of layers 24 and 22 have different inorganic filler/polymer ratios thus resulting in layers 22 and 24 with different inorganic filler/polymer ratios.

In one or more embodiments, composite layers are deposited simultaneously using extrusion coating processes, for example, slot die techniques. Extrusion coating involves extruding a layer of the coating solution from a slot die onto a moving web of the electrode material, which is then treated to remove the solvent and form a porous composite layer. By co-extruding coating solutions of different compositions through multiple slot dies individually extruded coating solutions are brought together as a multi-layer film.

The result of the foregoing process is the deposition onto an electrode (or other suitable substrate) of a bilayer composite separator comprised of two layers of polymer and ceramic particulate material that are intimately combined and porous. The process can be used to apply a porous bilayer composite separator onto a supporting substrate such as an electrode. These separator coatings have been found to be durable and highly adherent. The separators coated electrode may then be incorporated into battery cells, and the cell may include coatings on either or both of the anode and cathode electrodes. The electrode can be processed into a battery, e.g., by assembly the current collector, positive electrode, bilayer composite separator, negative electrode and current collector layers into a laminate structure and then bending or rolling the laminate structure into the appropriate form. In one or more embodiments, a nonaqueous electrolyte is used and includes an appropriate lithium salt dissolved in a nonaqueous solvent. The electrolyte may be infused into a porous bilayer composite separator that spaces apart the positive and negative electrodes.

Lamination of the battery cell electrodes utilizes the binder fusion of the composite separator layers. Lamination occurs when polymer chains of the composite separator layers entangle, a mechanism which requires movement of the polymer. In some embodiments, this fusion of the polymer binder occurs through the application of heat and pressure. For example, in FIG. 5, this fusion of the polymer binder occurs at 160° C. and 500 psi when the nanocomposite separator layers are dry (dry lamination), or 75° C. and 50 psi when the lamination is solvent assisted (wet lamination), given a constant lamination time of 3 minutes. Dry lamination requires higher temperature and pressure than the solvent wetted case because the polymer Tg is higher and the polymer chains are less mobile at a given temperature when the polymer is dry. The wet lamination process occurs under less forcing conditions because the solvent lowers the polymer Tg, and subsequently enables more facile chain entanglement due to the higher mobility of the polymer binder at a given temperature. As demonstrated by FIG. 5, wet lamination generates far less pore compaction, thus resulting in cells with better conductivity compared with dry lamination.

The bilayer composite separator can be used in any battery system that employs a liquid electrolyte imbibed in a porous solid separator. Exemplary batteries include nickel-cadmium (Ni—Cd), nickel-metal hydride (NiMH) sodium-sulfur and lithium ion batteries. In one or more embodiments, the electrochemical cell is a lithium ion cell. For the purpose of illustration, an electrochemical cell is described with reference to a lithium ion cell; however, as noted above, the multilayer composite separator can be used in a range of energy systems.

In one aspect, a laminated electrochemical cell having a positive electrode, a negative electrode, and a laminate multilayer composite separator layer between the two opposite electrodes formed by laminating the positive electrode and negative electrode in a facing relationship is described. The positive electrode includes a positive electrode current collector, a positive electrode active material layer disposed on one or both sides of the positive electrode current collector. The negative electrode includes a negative electrode current collector, a negative electrode active material layer disposed on one or both sides of the negative electrode current collector. The multilayer composite separator is disposed between the positive and negative electrodes and includes at least one inorganic filler-rich composite layer adjacent to one of the positive and negative electrodes and a polymer-rich composite layer adjacent to the inorganic filler-rich separator layer. The polymer-rich layer can be adjacent to the opposing electrode.

In some embodiments the multilayer separator can have a "sandwich" configuration in which inorganic filler-rich layers flank the polymer-rich layer. The inorganic filler-rich layers can contact the opposing positive and negative electrodes. The inorganic filler-rich layer is the predominant layer and makes up more than 50%, or more than 60%, or more than 70%, or more than 80%, or more than 90% or more than 95% of the total thickness.

The first and second porous composite separator layers include inorganic material and organic polymer in same or different weight ratios. The first and second porous composite separator layers have inorganic material to organic polymer weight ratios of about 20:80 to 80:20. For example, the first porous monolayer composite separator layer has an inorganic material to organic polymer weight ratio of about 20:80 to 49:51, e.g., a polymer-rich layer; and the second porous monolayer composite separator layer has an inorganic material to organic polymer weight ratio of about 51:49 to 80:20, e.g., an inorganic filler-rich layer. In other examples, the second porous monolayer composite separator layer has an inorganic material to organic polymer weight ratio of about 20:80 to 51:49, e.g., a polymer-rich layer; and the first porous monolayer composite separator layer has an inorganic material to organic polymer weight ratio of about 49:51 to 80:20, e.g., an inorganic filler-rich layer. The thickness of the first and second porous monolayer composite separator layers is selected so that, in combination, they have the desired thickness of the laminate multilayer composite separator layer in the assembled electrochemical cell. In one or more embodiment, the desired thickness of the laminate multilayer composite separator layer is about 2 to 40 μm. In one or more embodiment, the desired thickness of the laminate multilayer composite separator layer is about 10 to 30 μm. In one or more embodiment, the desired thickness of the laminate multilayer composite separator layer is about 20 μm. During assembly, the first and second porous monolayer composite separator layers are positioned in a facing relationship. The assembled electrodes are laminated under temperature and pressure selected to provide a robust adhesion of the first and second porous monolayer composite separator layers at the interface without significant compaction and porosity loss of the separator. As is described herein, the lamination can be conducted without using any solvent system, i.e., dry lamination. In one or more embodiments, during dry lamination, the two electrodes can be laminated at a temperature of 100° C. to 200° C. and under a pressure of 200-700 psi. In one or more embodiments, during dry lamination, the two electrodes can be laminated at about 160° C. and under a pressure of about 160 psi. As is described herein, the lamination can be conducted using a solvent system, i.e., wet lamination. In one or more embodiments, during wet lamination, the two electrodes can be laminated at a temperature of 20° C. to 100° C. and under a pressure of 20-100 psi. In one or more embodiments, during wet lamination, the two electrodes can be laminated at about 75° C. and under a pressure of about 50 psi.

The cathode active material layer 2 may be a porous composite particulate layer. The cathode active material may be a conventional cathode active material for a lithium ion secondary battery, such as a lithium-transition metal-phosphate compound, $LiCoO_2$, $LiNiO_2$ or $LiMn_2O_4$ and, the like. The lithium-transition metal-phosphate compound may be optionally doped with a metal, metalloid, or halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen.

The positive electrode containing the positive electroactive material has a specific surface area of the electrode measured using the nitrogen adsorption Brunauer-Emmett-Teller (BET) method after the densification or calendaring step that is greater than 10 $m^2/g$ or greater than 20 $m^2/g$. In some embodiments the cathode active material includes a powder or particulates with a specific surface area of greater than 10 $m^2/g$, or greater than 15 $m^2/g$, or greater than 20 $m^2/g$, or even greater than 30 $m^2/g$. A positive electrode can have a thickness of less than 125 µm, e.g., between about 50 µm to 125 µm, or between about 80 µm to 100 µm on each side of the current collector, and a pore volume fraction between about 40 and 70 vol. %. The active material is typically loaded at about 10-20 mg/$cm^2$, and typically about 11-15 mg/$cm^2$.

The anode active material layer 4 may also be a porous composite particulate layer. In one embodiment, the negative active material is a carbonaceous material or a lithium intercalation compound. The carbonaceous material may be non-graphitic or graphitic. A graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used. The carbonaceous material has a numerical particle size (measured by a laser scattering method) that is smaller than about 25 µm, or smaller than about 15 µm, or smaller than about 10 µm, or even less than or equal to about 6 µm.

Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include —BL, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

As the lithium salt, at least one compound from among $LiClO_4$, $LiPF_6$, $LiBF_4$, $LiSO_3CF_3$, $LiN(SO_2CF_3)_2$, $LiN(SO_2CF_2CF_3)_2$ and the like are used. The lithium salt is at a concentration from 0.5 to 1.5 M, or about 1.3 M.

In some embodiments, the negative active material consists of powder or particulates with a specific surface area measured using the nitrogen adsorption Brunauer-Emmett-Teller (BET) method to be greater than about 2 $m^2/g$, or 4 $m^2/g$, or even about 6 $m^2/g$. The negative electrode can have a thickness of less than 75 µm, e.g., between about 20 µm to 65 µm, or between about 40 µm to 55 µm on both sides of the current collector, and a pore volume fraction between about 20 and 40 vol. %. The active material is typically loaded at about 5-20 mg/$cm^2$, or about 4-5 mg/$cm^2$.

The electroactive material, conductive additive and binder are combined to provide a porous composite electrode layer that permits rapid lithium diffusion throughout the layer. The conductive additive such as carbon or a metallic phase is included in order to improve its electrochemical stability, reversible storage capacity, or rate capability. Exemplary conductive additives include carbon black, acetylene black, vapor grown carbon fiber ("VGCF") and fullerenic carbon nanotubes. Conductive additives are present in a range of about 1%-5% by weight of the total solid composition of the electrode. The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

The cathode and/or anode electrode layers can be manufactured by applying a semi-liquid paste containing the appropriate electroactive compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. The dried layers are calendared to provide layers of uniform thickness and density.

Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include —BL, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

A gel electrolyte may also be employed. The electrolyte may be a high molecular weight solid electrolyte, such as a gel, provided that the material exhibit lithium conductivity. Exemplary high molecular weight compounds include poly(ethylene oxide), poly(methacrylate) ester based compounds, or an acrylate-based polymer, and the like.

As the lithium salt, at least one compound from among LiClO$_4$, LiPF$_6$, LiBF$_4$, LiSO$_3$CF$_3$, LiN(SO$_2$CF$_3$)$_2$, LiN(SO$_2$CF$_2$CF$_3$)$_2$ and the like are used. The lithium salt is at a concentration from 0.5 to 1.5 M, or about 1.3 M.

Example 1

A Lamination Process of Electrodes with Bilayer Nanocomposite Separator Layers

The coating solution for a nanocomposite separator layer consisting of inorganic filler, polymer, solvent with desired ratio was coated onto at least one surface of an electrode material. The thickness of the layer coated onto the electrode depends upon the particular composition of the coating solution and the final thickness desired in the electrochemical cell. Following the coating, the solvent was removed from the coating mixture to leave a solid porous body of polymer/ceramic particles on the electrode. Optionally the composite can be further treated by heating the composite beyond the host polymer T$_m$ and then allowing it to cool down. The proceeding process was first conducted in such a manner to deposit a layer of 65:35 (fumed silica:PVdF weight ratio) nanocomposite separator onto the electrode. Once completed, a second layer of 45:55 (fumed silica:PVdF weight ratio) nanocomposite separator was applied over the top of the first layer using the same methodology.

The bilayer nanocomposite separator can be made using two steps of the coating techniques described above, or by any of a variety of co-coating techniques known to those in the field. These techniques include curtain coating or dual slot dies, amongst others.

The bilayer nanocomposite separator coating was applied to both the anode and the cathode symmetrically. The bilayer coating was 10 μm total with 8 μm of 65:35 (fumed silica:PVdF weight ratio) nanocomposite separator being placed adjacent to the active materials and 2 μm of 45:55 (fumed silica:PVdF weight ratio) nanocomposite separator being placed on top of that. Other embodiments could be asymmetric in their deposition of the total nanocomposite separator thickness.

For prismatic battery lamination, a series of anodes and cathodes were stacked alternating. The stack started and ended with an anode, thus there was one more anode than cathode in the final product.

Lamination was accomplished using two aluminum end plates and a stacking jig to assure proper alignment of the electrodes in the stack prior to lamination.

The first anode was placed in the stacking jig and was lightly misted with NMP using a low pressure, low volume airbrush until the bilayer of nanocomposite separator was just moist. The anode was allowed to sit for 30 seconds to allow the NMP to be fully absorbed. A cathode was then placed on top of the anode. The upward face of the cathode was lightly misted with NMP (just moistening the nanocomposite separator bilayer). Once moistened, an anode was immediately placed on the cathode. The difference in optimal solvent soak time is hypothesized to be a function of electrode porosity and there are four stages of wetness to the electrode—opaque white, matte, wet matte and glossy. Opaque white was a largely dry nanocomposite separator layer and did not laminate well. Matte, a coating with low reflectivity, laminated the best using previously described quality parameters. Wet matte, a medium reflectivity coating, laminated but had excess NMP present. The glossy, high reflectivity coating indicated too much NMP was applied and the risk of damaging the active material/current collector interface began to rise.

Once all electrodes had been sprayed and placed in the stacks the second aluminum end plate was put in place and the stack allowed to thermally equilibrate to 75° C. in the heated press for 1 minute. After 1 minute the pressure was increased to 50 psi and maintained for 3 minutes. After 3 minutes the pressure was released and the stack removed and allowed to cool before packaging and processing.

The foregoing illustrates one specific embodiment of this invention. Other modifications and variations of the invention will be readily apparent to those of skill in the art in view of the teaching presented herein. The foregoing is intended as an illustration, but not a limitation, upon the practice of the invention. It is the following claims, including all equivalents, which define the scope of the invention.

The invention claimed is:

1. An electrode/separator assembly, comprising:
   an electrode comprising an electrode current collector and an electroactive material layer disposed on one or both sides of the electrode current collector; and
   a porous multilayer composite separator layer disposed on one or both sides of the electrode,
   wherein said multilayer composite separator layer comprises at least first and second layers, said first and second layers comprising inorganic particulate material(s) and organic polymer(s) having different inorganic particulate material/organic polymer weight ratios;
   wherein the first layer of the multilayer composite separator layer having a first weight percent of polymer is disposed over the electrode; and the second layer containing a higher weight percentage of organic polymer than the first layer is disposed as the outermost layer of the multilayer composite separator; and
   wherein the thickness of said first layer is at least 80% of the total thickness of the multilayer composite separator; said first layer comprises greater than 50% inorganic particulate material by weight; and said second layer comprises greater than 50% organic polymer by weight.

2. The electrode/separator assembly of claim 1, wherein the thickness of said first layer is 80% to 90% of the total thickness of the multilayer composite separator.

3. The electrode/separator assembly of claim 2, wherein the thickness of said first layer is 90% of the total thickness of the multilayer composite separator layer.

4. The electrode/separator assembly of claim 2, wherein the thickness of said first layer is 80% of the total thickness of the multilayer composite separator layer.

5. The electrode/separator assembly of claim 2, wherein said first layer has an inorganic particulate material/organic polymer weight ratio of about 60:40 to 80:20; and said second layer has an inorganic particulate material/organic polymer weight ratio of about 49:51 to 20:80.

6. The electrode/separator assembly of claim 2, wherein said first layer has an inorganic particulate material/organic polymer weight ratio in the range of about 60:40 to 70:30; and said second layer has an inorganic particulate material/organic polymer weight ratio in the range of about 49:51 to about 40:60.

7. The electrode/separator assembly of claim 1, wherein said organic polymer comprises a polymer which is electrochemically compatible with Li-ion cells.

8. The electrode/separator assembly of claim 1, wherein the organic polymer is selected from the group consisting of polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers, polyacrylic acids and lithiated polyacrylic acids.

9. The electrode/separator assembly of claim 1, wherein said inorganic particulate material is selected from the group consisting of silica, alumina, titania, natural and synthetic zeolites, metal carbonates, zirconia, silicon phosphates, silicates and other electrochemically stable inorganic particles.

10. The electrode/separator assembly of claim 1, wherein the inorganic particulate material has a particle size in the range of 4 nm to about 500 nm.

11. The electrode/separator assembly of claim 1, wherein the inorganic particulate material has a particle size in the range of about 10 nm to about 20 nm.

12. The electrode/separator assembly of claim 1, wherein the inorganic particulate material has a particle size in the range of about 1 µm to about 6 µm.

13. A laminated electrochemical cell, comprising:

a positive electrode comprising a positive electrode current collector and a positive electrode active material layer disposed on one or both sides of the positive electrode current collector;

a negative electrode comprising a negative electrode current collector and a negative electrode active material layer disposed on one or both sides of the negative electrode current collector;

wherein at least one of the positive and negative electrodes comprises the electrode/separator assembly of claim 1;

and wherein the positive electrode and negative electrode are positioned in a facing relationship to form a laminate multilayer composite separator layer between the two opposite electrodes.

14. The laminated electrochemical cell of claim 13, wherein said electrochemical cell is a prismatic cell.

15. The laminated electrochemical cell of claim 13, wherein one of the positive or negative electrodes comprises the electrode/separator assembly of claim 1.

16. The laminated electrochemical cell of claim 15, wherein the other of the positive or negative electrode comprises a monolayer composite separator layer attached to one or both sides of the electrode.

17. The laminated electrochemical cell of claim 13, wherein both of the electrodes comprise the electrode/separator assembly of claim 1.

18. The laminated electrochemical cell of claim 13, wherein the total thickness of a multilayer composite separator layer is in the range of about 2 to 40 µm.

19. The laminated electrochemical cell of claim 18, wherein said laminate multilayer composite separator layer between the two opposite electrodes has a thickness of about 20 µm.

* * * * *